United States Patent
Passmore et al.

(10) Patent No.: US 11,232,283 B1
(45) Date of Patent: Jan. 25, 2022

(54) FACIAL RECOGNITION SYSTEM THAT COMPARES NARROW BAND ULTRAVIOLET-ABSORBING SKIN CHROMOPHORES

(71) Applicant: VR Media Technology, Inc., Los Angeles, CA (US)

(72) Inventors: Charles Gregory Passmore, Austin, TX (US); Sabine Bredow, Austin, TX (US)

(73) Assignee: VR Media Technology, Inc., Los Angeles, CA (US)

( * ) Notice: Subject to any disclaimer, the term of this patent is extended or adjusted under 35 U.S.C. 154(b) by 0 days.

(21) Appl. No.: 17/322,818

(22) Filed: May 17, 2021

(51) Int. Cl.
*G06K 9/00* (2006.01)
*G06K 9/20* (2006.01)

(52) U.S. Cl.
CPC ..... *G06K 9/00255* (2013.01); *G06K 9/00268* (2013.01); *G06K 9/00288* (2013.01); *G06K 9/2018* (2013.01)

(58) Field of Classification Search
CPC ........... G06K 9/00255; G06K 9/00288; G06K 9/2018; G06K 9/00268
See application file for complete search history.

(56) References Cited

U.S. PATENT DOCUMENTS

| 6,647,157 B1 * | 11/2003 | Shiiyama | G06K 9/4647 358/403 |
| 8,824,828 B1 * | 9/2014 | Winn | H04N 5/367 382/274 |
| 9,892,324 B1 * | 2/2018 | Pachauri | G06K 9/00288 |

(Continued)

FOREIGN PATENT DOCUMENTS

| CN | 101571911 | * 11/2009 |
| KR | 101995466 | * 7/2019 |

OTHER PUBLICATIONS

Lu et al., "Matching 2.5D Face Scans to 3D Models", IEEE Transactions on Pattern Analysis and Machine Intelligence, vol. 28, No. 1, Jan. 2006 (Year: 2006).*

(Continued)

*Primary Examiner* — Qian Yang
(74) *Attorney, Agent, or Firm* — Arc IP Law, PC; Joseph J. Mayo (57) ABSTRACT

Facial recognition system that compares narrow band ultraviolet-absorbing skin chromophores to identify a subject. Ultraviolet images show much greater facial detail than visible light images, so matching of ultraviolet images may be much more accurate. Embodiments of the system may have a camera that is sensitive to ultraviolet, and a special lens and filter that pass the relevant ultraviolet wavelengths. A database of known persons may contain reference ultraviolet facial images tagged with each person's identity. Reference images and subject images may be processed to locate the face, identify features (such as chromophores), compare and match feature descriptors, and calculate correlation scores between the subject image and each reference image. If the subject is moving, the subject's face may be tracked, a 3D model of the subject's face may be developed from multiple images, and this model may be rotated so that the orientation matches that of the reference images.

17 Claims, 13 Drawing Sheets

(8 of 13 Drawing Sheet(s) Filed in Color)

(56) References Cited

U.S. PATENT DOCUMENTS

| | | | | |
|---|---|---|---|---|
| 2009/0175509 | A1* | 7/2009 | Gonion | G06K 9/6253 |
| | | | | 382/118 |
| 2009/0185185 | A1* | 7/2009 | Shakespeare | G01J 3/36 |
| | | | | 356/406 |
| 2014/0125809 | A1* | 5/2014 | Thorsted | H04N 5/23293 |
| | | | | 348/162 |
| 2015/0054823 | A1* | 2/2015 | Dzhurinskiy | G06T 19/006 |
| | | | | 345/419 |
| 2015/0269406 | A1* | 9/2015 | Hama | G06T 5/00 |
| | | | | 382/124 |
| 2016/0284123 | A1* | 9/2016 | Hare | G06K 9/00261 |
| 2017/0300685 | A1* | 10/2017 | Teichman | G06T 7/73 |
| 2018/0343501 | A1* | 11/2018 | Yu | G06F 16/7328 |

OTHER PUBLICATIONS

Machine translation for CN 101571911 (Year: 2009).*
Machine translation for KR 101995466 (Year: 2019).*

* cited by examiner

FACIAL RECOGNITION SYSTEM THAT COMPARES NARROW BAND ULTRAVIOLET-ABSORBING SKIN CHROMOPHORES

BACKGROUND OF THE INVENTION

Field of the Invention

One or more embodiments of the invention are related to the field of image processing. More particularly, but not by way of limitation, one or more embodiments of the invention enable a facial recognition system that compares narrow band ultraviolet-absorbing skin chromophores.

Description of the Related Art

Facial recognition systems are commonly used to identify a person by matching an image of the person's face to a database of face images. Existing systems do not have high accuracy, particularly when images are captured in uncontrolled environments or when the person to be identified is moving around or is in a crowd.

One of the reasons for the limited accuracy of existing systems is that images of faces do not provide a large number of distinctive features to match upon. The inventor has discovered that many more facial features are visible in the ultraviolet band, because many facial chromophores appear only in this band. Using ultraviolet images for facial recognition can therefore greatly increase accuracy and extend the situations in which facial recognition can be used.

For at least the limitations described above there is a need for a facial recognition system that compares narrow band ultraviolet-absorbing skin chromophores.

BRIEF SUMMARY OF THE INVENTION

One or more embodiments described in the specification are related to a facial recognition system that compares narrow band ultraviolet-absorbing skin chromophores. Embodiments of the invention may identify an unknown subject by comparing an ultraviolet image of the subject's face to a database of known persons with corresponding ultraviolet facial images.

One or more embodiments of the invention include an ultraviolet spectrum image capture element with a filter that selects wavelengths in an ultraviolet band and an ultraviolet camera that is sensitive to at least this ultraviolet band. These embodiments may also have a database of person facial images captured in this ultraviolet band, where each image is associated with a person. They may also have one or more processors coupled to the image capture element and to the database. The processor(s) may process the database images by identifying features in each person's facial image, and calculating descriptors of these features. The processor(s) may obtain an image of a subject, locate the subject's facial image, identify features in the subject's facial image, and calculate descriptors of those features. The processor(s) may then compare feature descriptors of the subject facial image to those of each person's facial image to calculate a correlation score for each person facial image in the database, and then select a matching person facial image with the highest correlation score, when that score is also greater than a threshold value. The subject may then be identified as the person associated with the matching person facial image. In one or more embodiments, the anchors/corners and correlation may be implemented with a Fourier transform to compare spectrograms, e.g., of the subject and person. In one or more embodiments, the Fourier domain may be much faster and lend itself to optical computing to eliminate computers entirely from the imaging and comparison process. Such embodiment would not require a sensor, but use filters and a lens, capture the focal point to obtain the frequency spectrum, mask with a vibrating imaging light valve (OLED or CD panel) and measure the overall light passing through with an optical integrator. This embodiment can perform extremely rapid comparisons and bypass the sensor scanout for example.

In one or more embodiments, the wavelengths in the ultraviolet band may include 365 nanometers. The bandwidth of this band may be less than or equal to 25 nanometers. In one or more embodiments the ultraviolet band may for example include a range of 360 to 370 nanometers.

In one or more embodiments, the ultraviolet image capture element may have a lens that is made of or contains one or more of quartz, fused silica, sapphire, magnesium fluoride, calcium fluoride or thin low count glass elements or pancake lenses.

One or more embodiments may identify features in the subject facial image and the person facial images in the database using a corner detector, such as any selected from the Moravec family of corner detectors, e.g., a Harris-Stephens, Kanade-Lucas-Tomasi, Shi-Tomasi, Förstner corner detector or similar algorithm. Feature descriptors may be for example SURF descriptors.

In one or more embodiments, calculation of a correlation score between a person facial image and a subject facial image may include calculating matching feature pairs between the two images, where features match if their feature descriptors match. The correlation score may be for example the count of the number of matching feature pairs. Another correlation score that may be used in one or more embodiments is a measure of the similarity of the slopes of line segments connecting the features of matching pairs.

In one or more embodiments, the processor(s) may enhance the contrast of the person facial images and the subject facial image, using for example a local S-curve transformation.

In one or more embodiments, the processor(s) may transform the person facial images and the subject facial image to a standard size and aspect ratio.

In one or more embodiments, the processor(s) may obtain a sequence of scene images from the ultraviolet camera over a time period, locate a first facial image in one of the scene images, and locate a corresponding sequence of face images in the sequence of scene images. The processor(s) may then construct a 3D model of the face from the sequence of face images, and rotate this 3D model to the orientation of each person facial image to form the subject image to be compared to the database. Locating the face image in the sequence of scene images may include identifying anchor points in the first facial image, and locating points in the sequence of scene images that match the anchor points. Anchor point identification and matching may for example use a SIFT algorithm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein.

DETAILED DESCRIPTION OF THE INVENTION

A facial recognition system that compares narrow band ultraviolet-absorbing skin chromophores will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1A:
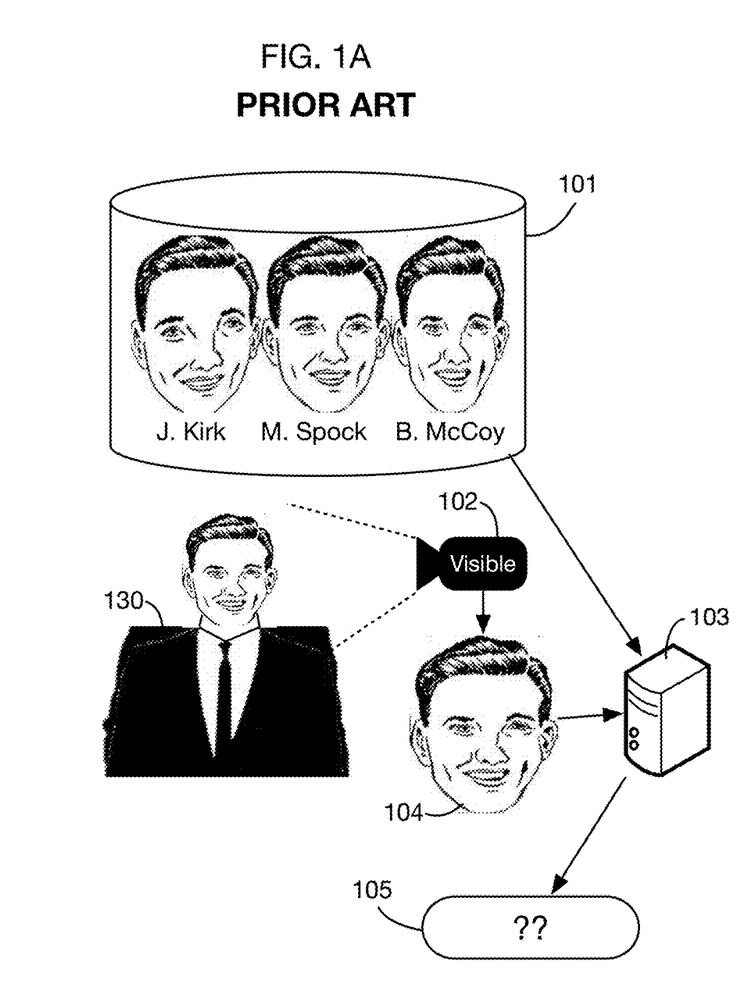
FIG. 1A shows an architecture of a typical facial recognition system known in the art, which compares images captured in the visible spectrum.

FIG. 1A shows elements of a typical facial recognition system known in the art. Such systems may have a database 101 of facial images, each tagged with the identity of the person associated with the face. When an unknown subject 130 arrives, a camera 102 may capture an image 104 of the subject's face, and one or more processors 103 may then compare the image 104 to the images in database 101 to look for a match. The image 104 and the reference images in database 101 are typically captured with a visible light camera (or cameras) 102. In the example shown in FIG. 1A, the visible spectrum images of the three illustrative persons shown in database 101 are very similar; therefore it is difficult for processor 103 to determine which image (if any) matches the subject image 104. The recognition process may therefore fail and report result 105 indicating that it cannot determine who the subject is, or it may report a best match that may be incorrect or have low confidence. This possibility of ambiguity or low accuracy increases as the number of reference images and identities in database 101 becomes large. For example, in a database with millions of entries, it becomes likely that two or more people will have very similar facial appearance, making recognition difficult or impossible.

Figure 1B:
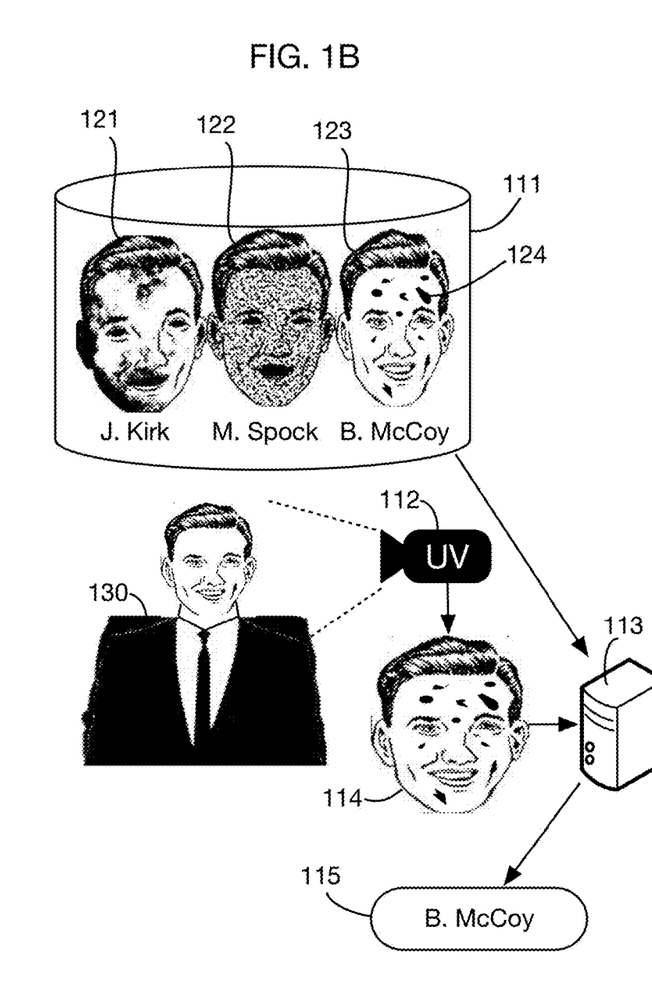
FIG. 1B shows an architecture of an illustrative embodiment of the invention, which compares images captured in the ultraviolet spectrum to achieve more accurate person recognition.

FIG. 1B shows illustrative components of one or more embodiments of the invention. The inventor has discovered that using ultraviolet spectrum facial images provides a much more reliable and robust method of recognizing persons from their facial images. Instead of (or in addition to) visible camera(s) 102, one or more embodiments of the invention may use ultraviolet camera(s) 112 to capture images of subject 130 and reference images of persons in a database 111. A benefit of using ultraviolet images is that ultraviolet reveals considerably greater details of facial appearance; chromophores in facial skin that are sensitive to ultraviolet wavelengths may vary significantly across persons, even if they have similar visible-spectrum appearances. In the example shown in FIG. 1B, ultraviolet images 121, 122, and 123 of the three persons that were close in appearance to subject 130 in the visible spectrum reveal significant differences in the ultraviolet spectrum. For example, image 123 has chromophores such as chromophore 124 that do not appear in the other persons. Processor or processors 113 may therefore compare subject ultraviolet image 114 to the ultraviolet images in database 111 to find an unambiguous match 115 without difficulty. In addition to reducing ambiguity, use of ultraviolet images may improve the robustness of facial recognition under conditions such as variable lighting or for subjects that present at different angles or distances, or with partially covered faces; small zones of the face may still provide distinctive features when examined in the ultraviolet spectrum.

Illustrative applications of the ultraviolet facial recognition system shown in FIG. 1B may include for example, without limitation, control of entry into a secure facility, tracking of the location of persons of interest, border control, contactless payment/banking/ATM transactions, investigation of crimes from surveillance video, or screening crowds for suspects or persons of interest.

Figure 2:
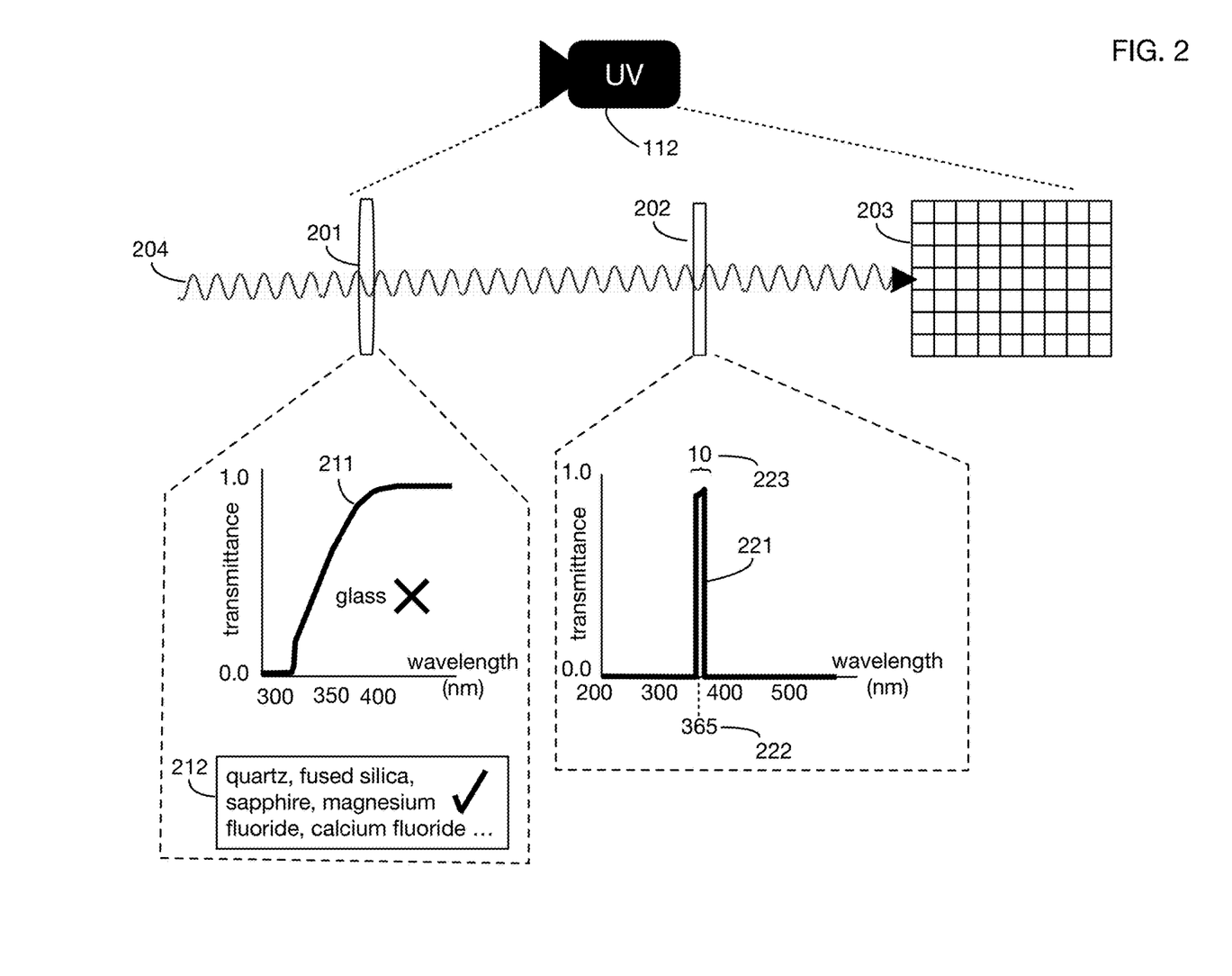
FIG. 2 shows illustrative components of an ultraviolet spectrum imaging system that may be used in one or more embodiments of the invention.

FIG. 2 shows components of an illustrative ultraviolet imaging system 112 that may be used in one or more embodiments of the invention. The imaging system may have for example a lens (or lenses) 201, a filter (or filters) 202, and an image capture element (or elements) 203. (Other components may be present in one or more embodiments, such as lights to illuminate a scene or to provide reference sources for calibration, heating or cooling elements, or components to compensate for temperature or other environmental conditions.) The lens 201 and filter 202 may be designed or selected to pass the desired ultraviolet wavelengths 204 through to the image capture element 203, and to block or attenuate other wavelengths. For ultraviolet imagery, glass lenses are typically inappropriate, since the transmittance 211 of glass is low for ultraviolet frequencies. Therefore in one or more embodiments materials 212 such as quartz, fused silica, sapphire, magnesium fluoride, or calcium fluoride may be used for lens 201. Filter 202 may select a range of wavelengths for image capture element 203, with a response function 221. In one or more embodiments, the desired bandwidth for images may be approximately a band of bandwidth 223 approximately equal to 10 nanometers, centered at wavelength 222 of approximately 365 nanometers. These values are illustrative; one or more embodiments may use different wavelength bands for ultraviolet images. For example, one or more embodiments may use a band of bandwidth 25 nanometers or less. In one or more embodiments, image capture element 203 may be for example a backside illuminated CMOS monochrome imaging sensor without an internal hot-mirror filters, which is sensitive to ultraviolet and infrared light between 200 nanometers and 1000 nanometers.

Figure 3:
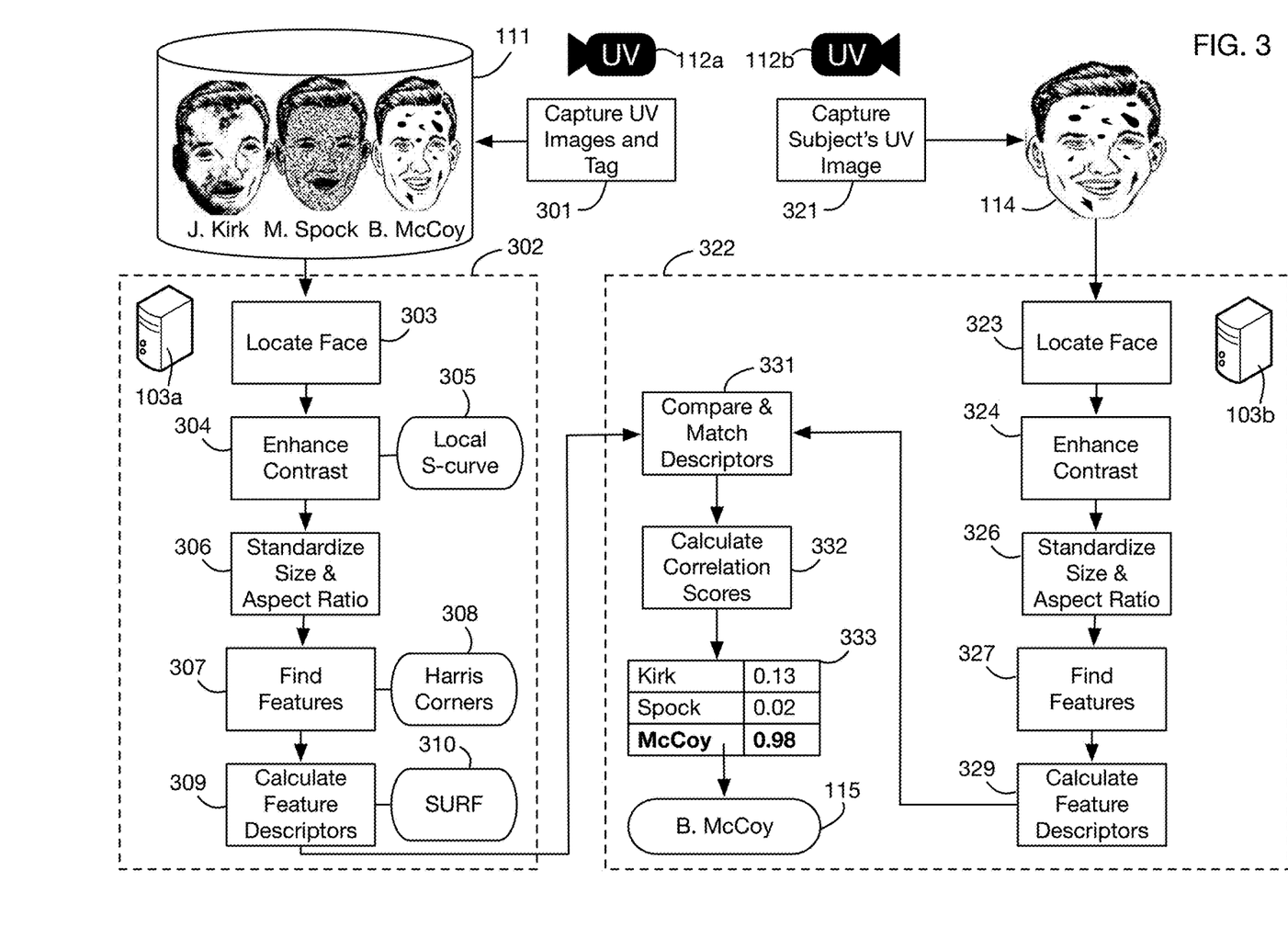
FIG. 3 shows illustrative processing steps to transform and compare ultraviolet images of an unknown subject to a database of ultraviolet images tagged with person identities.

FIG. 3 shows illustrative processing steps that may be used in one or more embodiments to capture, transform, and compare images for facial recognition. Database 111 may be constructed or augmented with step 301 that captures ultraviolet images and tags them with the identity or other information associated with the persons captured. A subject to be identified may have one or more ultraviolet images such as image 114 captured in step 321 using one or more ultraviolet cameras 112b. The camera or cameras 112a that capture the reference images in database 111 may be the same as or different from camera or cameras 112b that image the subject.

Images in database 111 may be processed or transformed using steps 302 to facilitate matching and recognition; this processing may occur when the database images are captured, or any time thereafter. Processed or transformed images, and any derived data, may be stored in database 111 or generated as needed. These steps 302 may be performed by one or more processors 103a. When a subject is to be recognized, processing steps 322 may be performed to process the subject image(s) 114 and to attempt to match the subject against the database 111. These steps 322 may be performed by one or more processors 103b, which may be the same as or different from processor(s) 103a. Processors 103a and 103b may be collocated with or remote from cameras 112a and 112b. Processors may include for example, without limitation, microprocessors, microcontrollers, customized analog or digital circuits, laptop computers, notebook computers, tablet computers, server computers, smartphones, or networks of any of these devices.

In one or more embodiments, the steps contained in 302 and 322 may be performed in any order, or any subsets of these steps may be performed. One or more embodiments may perform additional processing steps on either or both of database images 111 or subject images 114. Steps 302 may be performed on each of the images in database 111, or on selected subsets of these images.

Step 303 may locate a face in an image captured by imaging system 112a. Techniques for finding faces in images are known in the art, and one or more embodiments may use any of these techniques. Outputs of this step 303 may for example include a bounding box around a face area of interest. Step 304 may then enhance the contrast of the facial image. This step may either increase or decrease contrast in an image, either locally or globally. An illustrative method 305 of contrast enhancement that may be used in one or more embodiments is to apply a local S-curve transformation to the image. The inventor has discovered that applying a localized, overlapping, adaptive S-curve transformation often provides better results than applying a single S-curve to an entire image, and that it also often provides better results than histogram equalization or linear stretch convolutional filtering. In one or more embodiments, the S-curves may be selected or modified based on current or expected lighting conditions, which may be measured or estimated based on factors such as time of day and weather. Step 306 may then transform the facial image to a standard size and aspect ratio. Standardizing the size allows for comparison of images captured at different distances, for example, and standardizing the aspect ratio facilitates feature matching.

Step 307 locates features in the ultraviolet facial image. Any type of feature detection may be used. For example, features may be corners, blobs, or other types of points of interest or areas of interest. In one or more embodiments, features may be detected for example with a corner detector 308 selected from the Moravec family of corner detectors, e.g., a Harris-Stephens, Kanade-Lucas-Tomasi, Shi-Tomasi, Förstner corner detector or similar algorithm. Step 309 then calculates a descriptor for each feature. The descriptor may for example describe the local environment around the feature. An illustrative descriptor 310 that may be used in one or more embodiments is a SURF ("Speeded Up Robust Features") descriptor, which provides a scale-invariant and rotation-invariant descriptor.

Steps 323 through 329 perform similar steps on subject ultraviolet facial image 114 as those described above for steps 302 on database ultraviolet images. The specific techniques and algorithms used for each step 323 through 329 may or may not correspond to those used for steps 303, 304, 306, 307, and 309. However, for ease of implementation and comparison, in one or more embodiments the enhance contrast step 324 may also use local S-curves 305, the find features step 327 may also use corner detector 308 selected from the Moravec family of corner detectors, e.g., a Harris-Stephens, Kanade-Lucas-Tomasi, Shi-Tomasi, Förstner corner detector or similar algorithm, and the calculate feature descriptors step 329 may also use a SURF algorithm.

After features have been located in database images 111 and in subject image 114, and feature descriptors have been calculated, descriptor matching step 331 may be performed to compare the descriptors of features of image 114 to those of each of the database images 111. Feature matching may be performed using any of the image matching algorithms known in the art; for example, a distance measure may be defined in feature space and each feature descriptor in one image may be matched to its nearest neighbor, if the distance to the nearest neighbor is below a threshold value. After matching, step 332 may calculate one or more correlation scores between subject image 114 and each of the images in database 111. Each correlation score describes how closely the subject image matches a database image. Correlation scores may be on any quantitative or qualitative scale, and may be calculated using any algorithm. Illustrative results 333 show the maximum correlation score is for the image associated with person 115. This maximum correlation score may be compared to a threshold correlation value to determine whether the correlation is sufficiently close that the subject should be considered a match to the person with the highest correlation.

Figure 4:
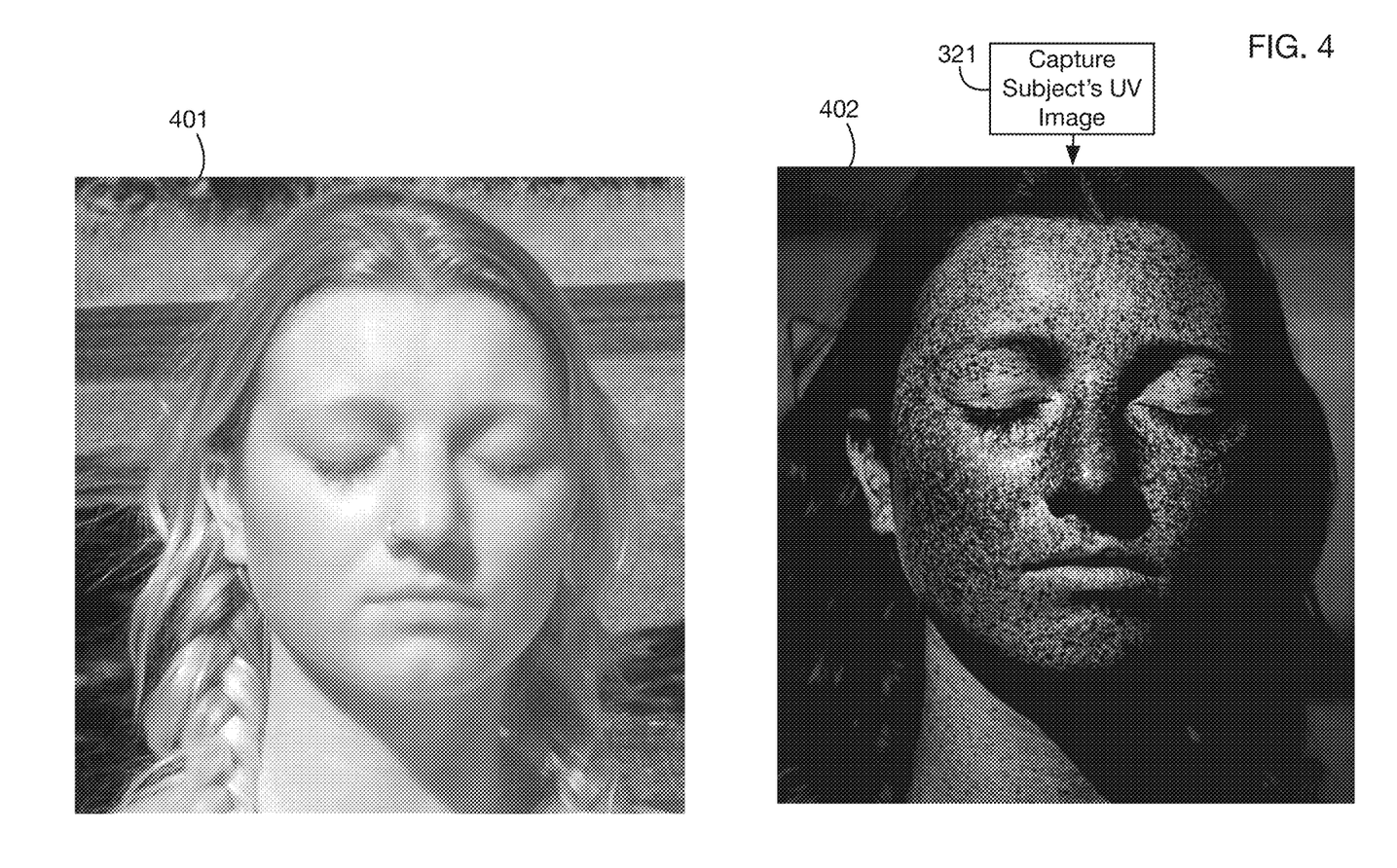
FIG. 4 shows an example of a visible spectrum image of a subject compared to an ultraviolet image of the subject, illustrating the additional detail in the ultraviolet image.
Figure 5:
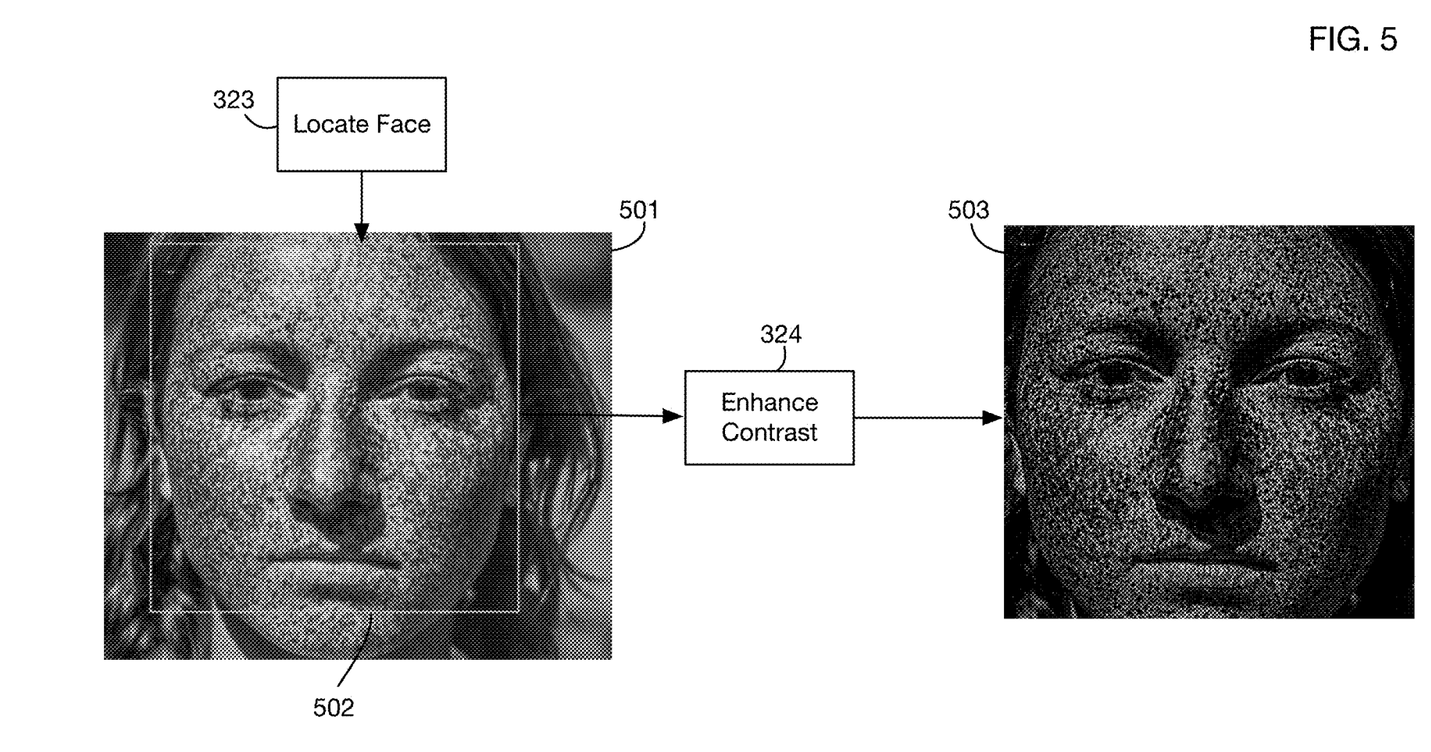
FIG. 5 illustrates two processing steps that may be performed on images: location of a face area of interest in an image, and enhancing the contrast of this area.
Figure 6:
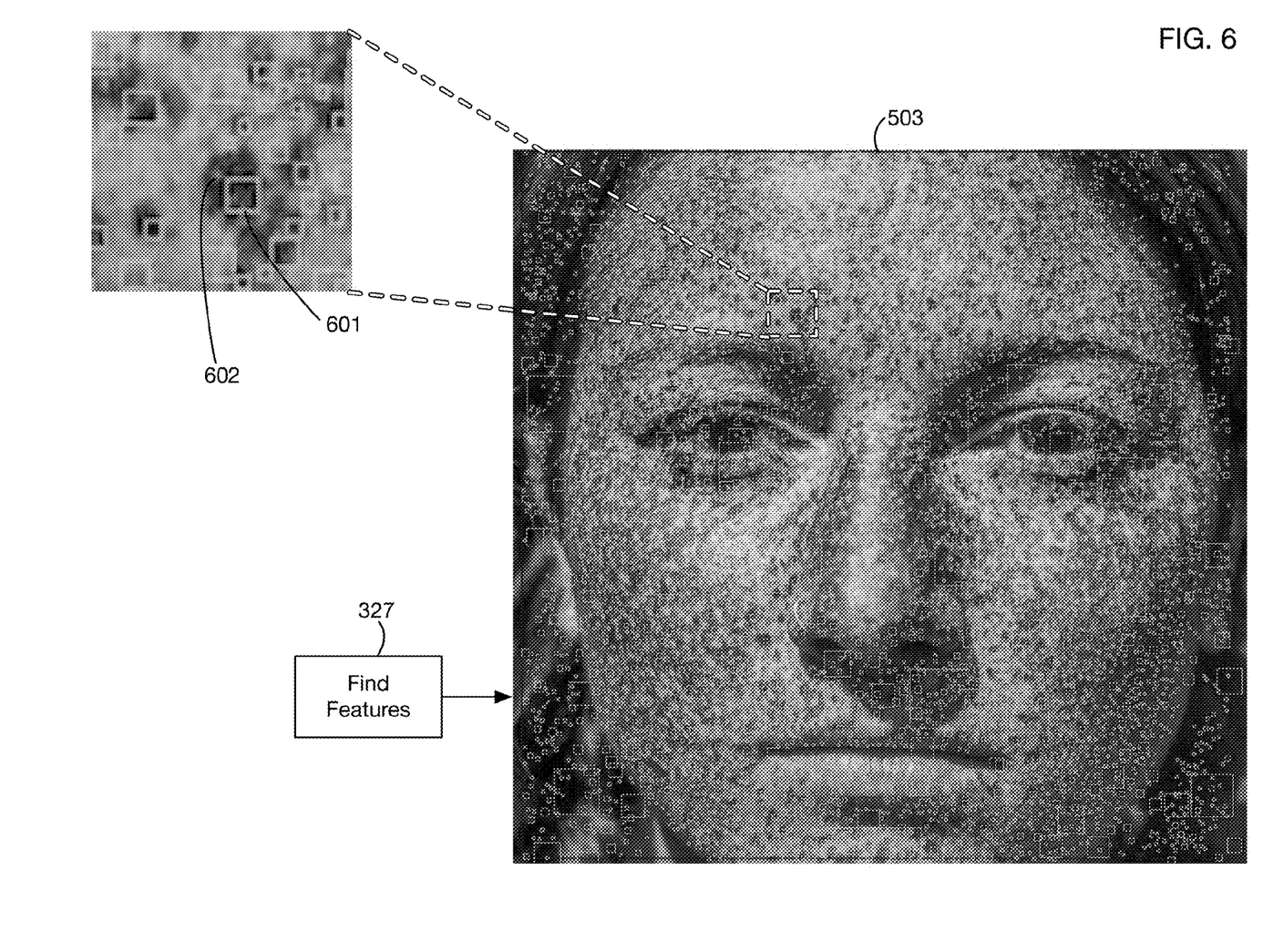
FIG. 6 illustrates location of features in a facial ultraviolet image.

We now illustrate some of the steps shown in FIG. 3 with actual images captured in the ultraviolet spectrum. FIG. 4 shows an illustrative ultraviolet image 402 captured in step 321, and compares it to visible light image 401 of the same subject. The chromophores visible in image 402 provide a much more detailed set of features for matching than the visible light image 401. FIG. 5 shows a facial area of interest 502 located by step 323 in image 501. Locating a facial area of interest may for example use a neural network trained to find faces. Image 503 is the result of contrast enhancement step 324 applied to area of interest 502. FIG. 6 shows results of the feature finding step 327 applied to enhanced facial image 503, showing that many features are located in the ultraviolet face, and many of these features are ultraviolet-sensitive chromophores. For example, feature 601 corresponds to chromophore 602.

Figure 7:
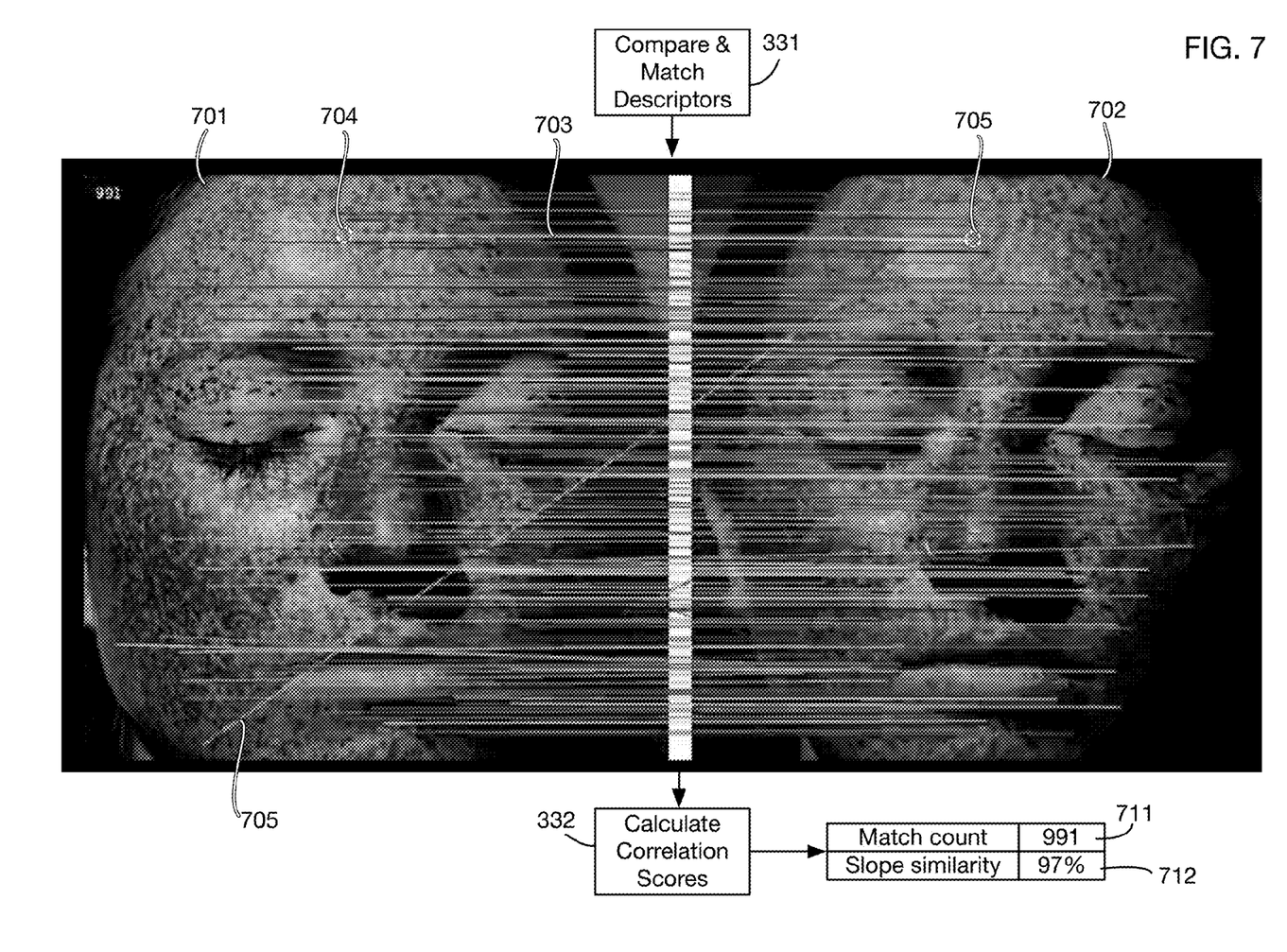
FIG. 7 illustrates matching of two ultraviolet images, here of the same person, by comparing features and calculating correlation scores.

FIG. 7 illustrates comparison step 331 between two ultraviolet images 701 and 702 of the same person. Features have been detected in each face as shown for example in FIG. 6, and descriptors of each feature have been calculated and compared. The line segments connecting the two images are between feature pairs with matching descriptors. (Matching of feature descriptors may use any of the methods known in the art. Matching may be for example based on a distance metric between descriptors that must be below some threshold value for descriptors to match.) Only some of the matching features are shown for ease of illustration. An illustrative match is between feature 704 in image 701 and feature 705 in image 702, with line segment 703 connecting these features. Calculation of correlation scores 332 may for example use the count of the number of matching feature pairs 771, which is high because the two images are of the same person. Another measure of correlation may be for example the parallelism or similarity of the slopes of the lines connecting matching feature points. In FIG. 7, most of the lines, such as line 703, are roughly parallel and therefore have very similar or identical slopes. An exception is line 705, which incorrectly matches two different points in the face, due for example to noise in the image or variations in lighting conditions. The measure of slope similarity 712 also indicates a very close match between the two images.

Figure 8:
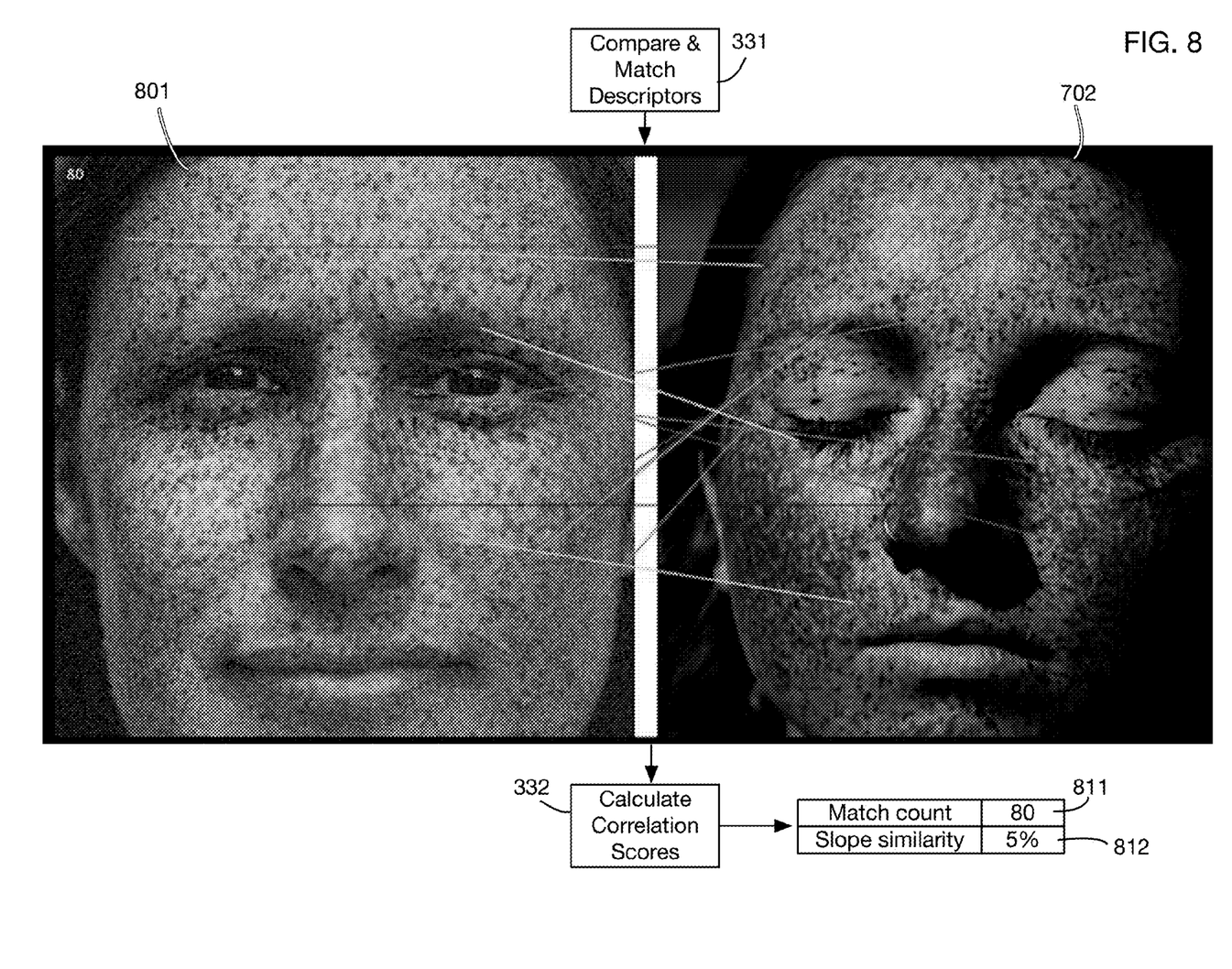
FIG. 8 illustrates comparison of ultraviolet images of different persons.

FIG. 8 shows the results of comparison step 331 between two ultraviolet images 801 and 702 of different people. As in FIG. 7, only some matching feature pairs are shown for ease of illustration. The count 811 of matching feature pairs is much lower than the corresponding count 711 in FIG. 7. Also, the line segments between matching features in FIG. 8 appear to have random slopes, so the measure 812 of slope similarity is low. From these measures it is apparent that image 701 is a much better match for image 702 than is image 801.

Figure 9:
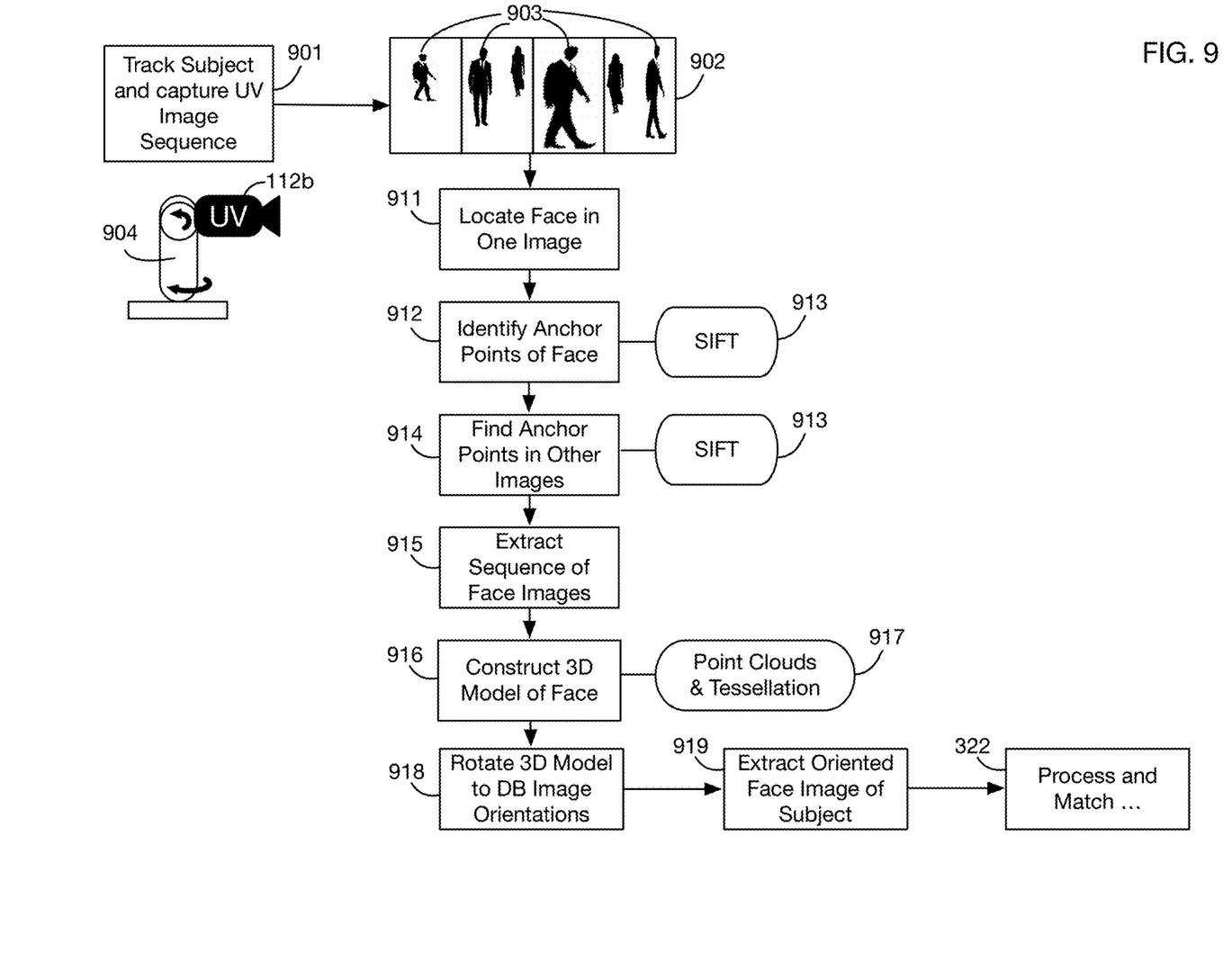
FIG. 9 shows illustrative processing steps that may be performed on a sequence of ultraviolet images of a scene containing the unknown subject.

In some applications of the invention, a subject may appear in front of a camera for identification; this situation may apply for example for entry control. However, in other applications the facial recognition system may for example monitor a crowd of people moving through an area, such as an airport, and may try to identify people in the crowd. This situation may be more challenging because the imaging system may capture subjects at different scales and orientations, and may also have to track a potential subject in a crowd of other people. FIG. 9 shows illustrative steps that may be performed in one or more embodiments to perform facial recognition in this type of situation. These steps may be performed by any processor or processors, including but not limited to the processors 103a and 103b described with respect to FIG. 3. An ultraviolet sensitive imaging system 112b may perform step 901 to capture a sequence of ultraviolet images 902 of a scene, where some or all of these images capture a view of subject 903. In one or more embodiments, the imaging system may include for example a pan-tilt system 904 to track a subject as he or she moves through an area. Step 911 may then locate a face of a subject in one of the scene images in the sequence, and then step 912 may identify anchor points on the face. In step 914, these anchor points may be located in other scene images of sequence 902, to determine the location of the subject's face in each image. An illustrative method 913 that may be used for anchor point detection and matching is SIFT ("scale invariant feature transform"). Once the subject's face is located in each image, step 915 may extract a sequence of face images from sequence 902. Because the face is visible from multiple distances and angles as the subject moves around, standard photogrammetry methods known in the art may be used to construct a three-dimensional model of the face from the sequence of face images. For example, to perform step 916 to construct this model, face images may be converted in step 917 to point clouds that are then tessellated to form a surface of the face; the images may be texture mapped to the model to form the complete 3D facial model. In step 918, the 3D model of the face may be rotated so that the resulting orientation of the face matches the orientation of the face or faces in the database (which may be roughly level and facing forward, for example). This orientation may be standardized in the database, or it may differ across database entries. The correctly oriented face image may then be extracted in step 919 to form the subject face image, which may then be processed and match using steps 922 as described above.

Figure 10:
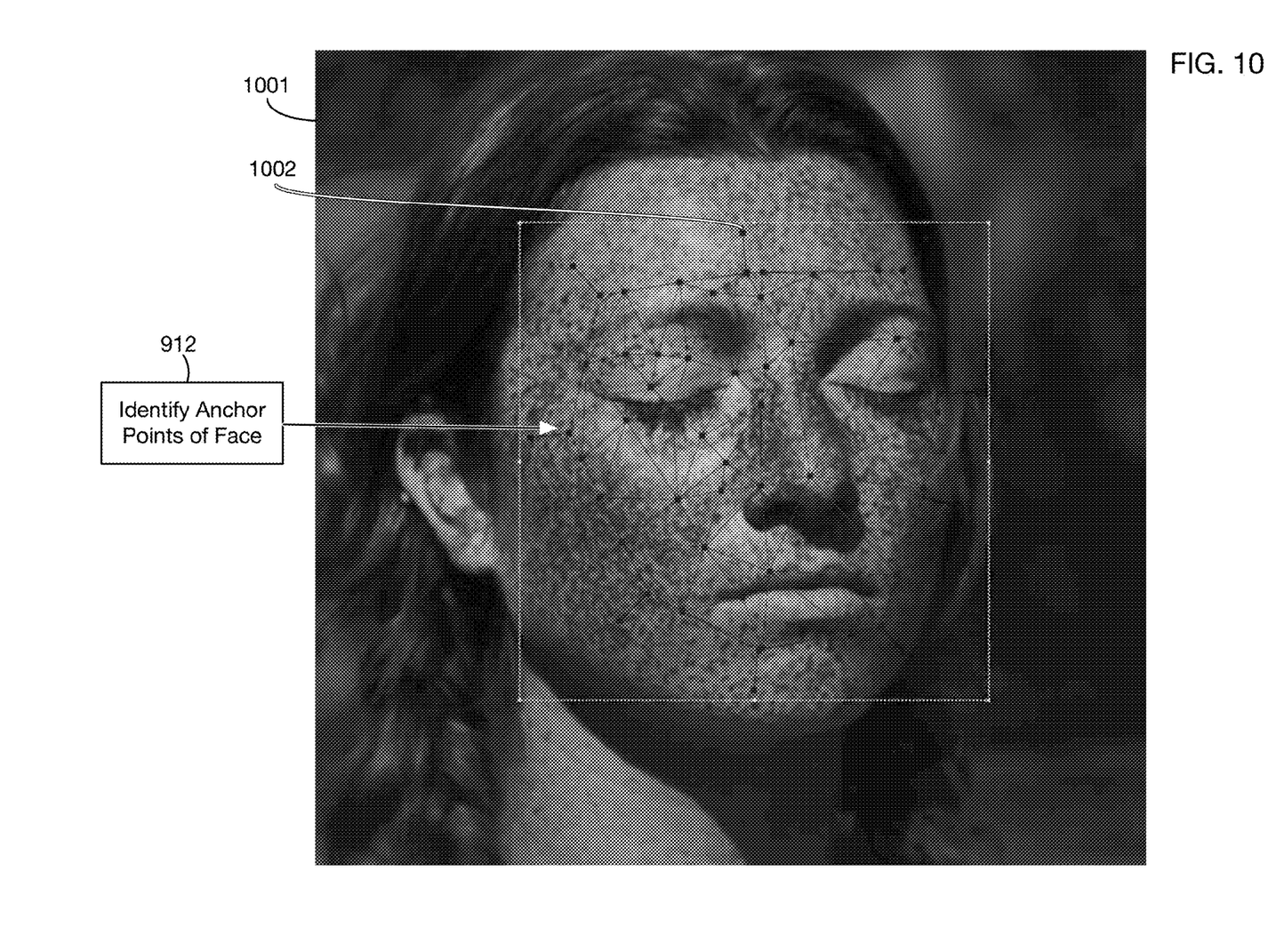
FIG. 10 illustrates locating facial anchor points in an ultraviolet image.
Figure 11:
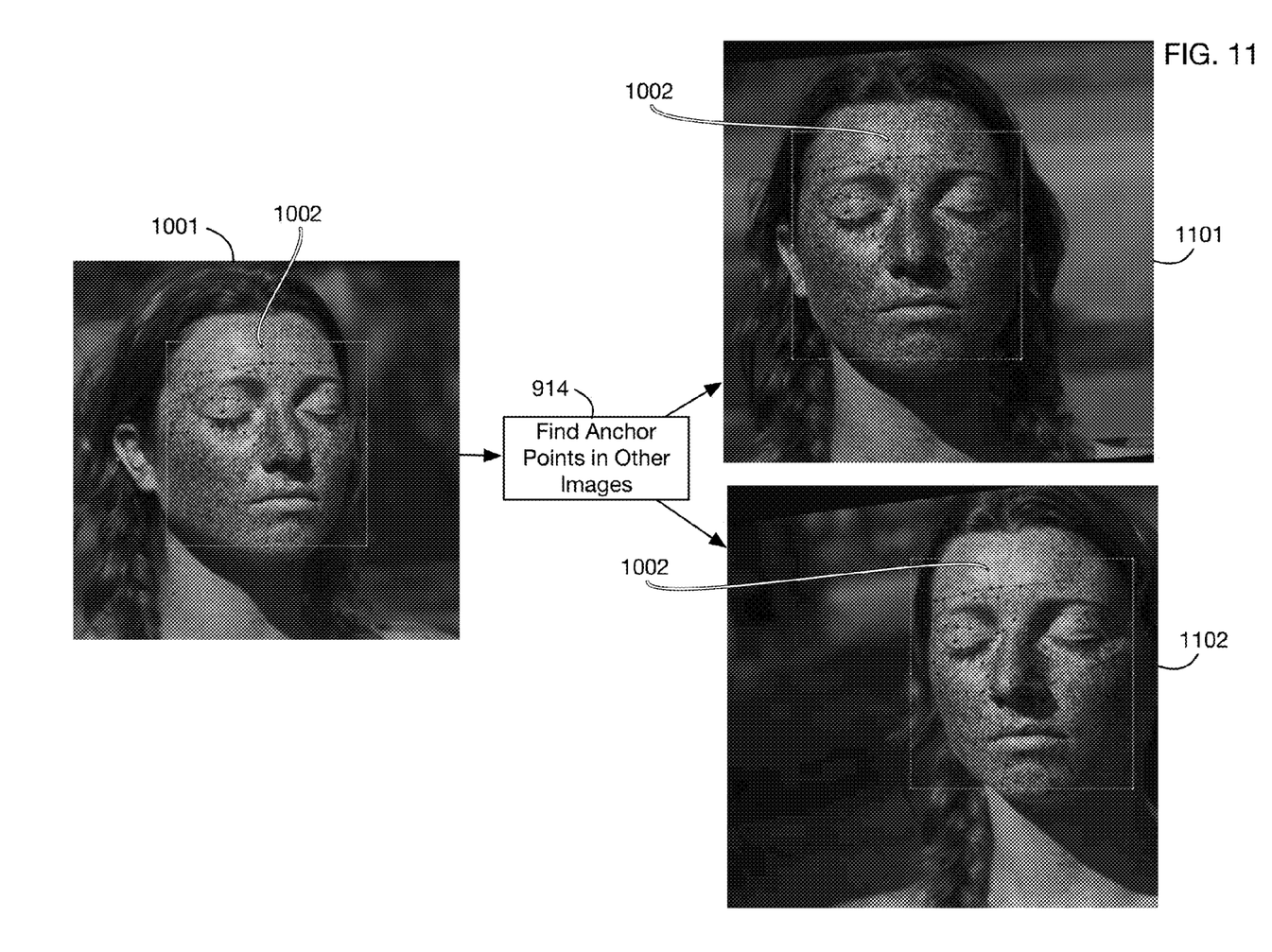
FIG. 11 illustrates tracking the face of FIG. 10 using the facial anchor points as the person moves into different positions or orientations.
Figure 12:
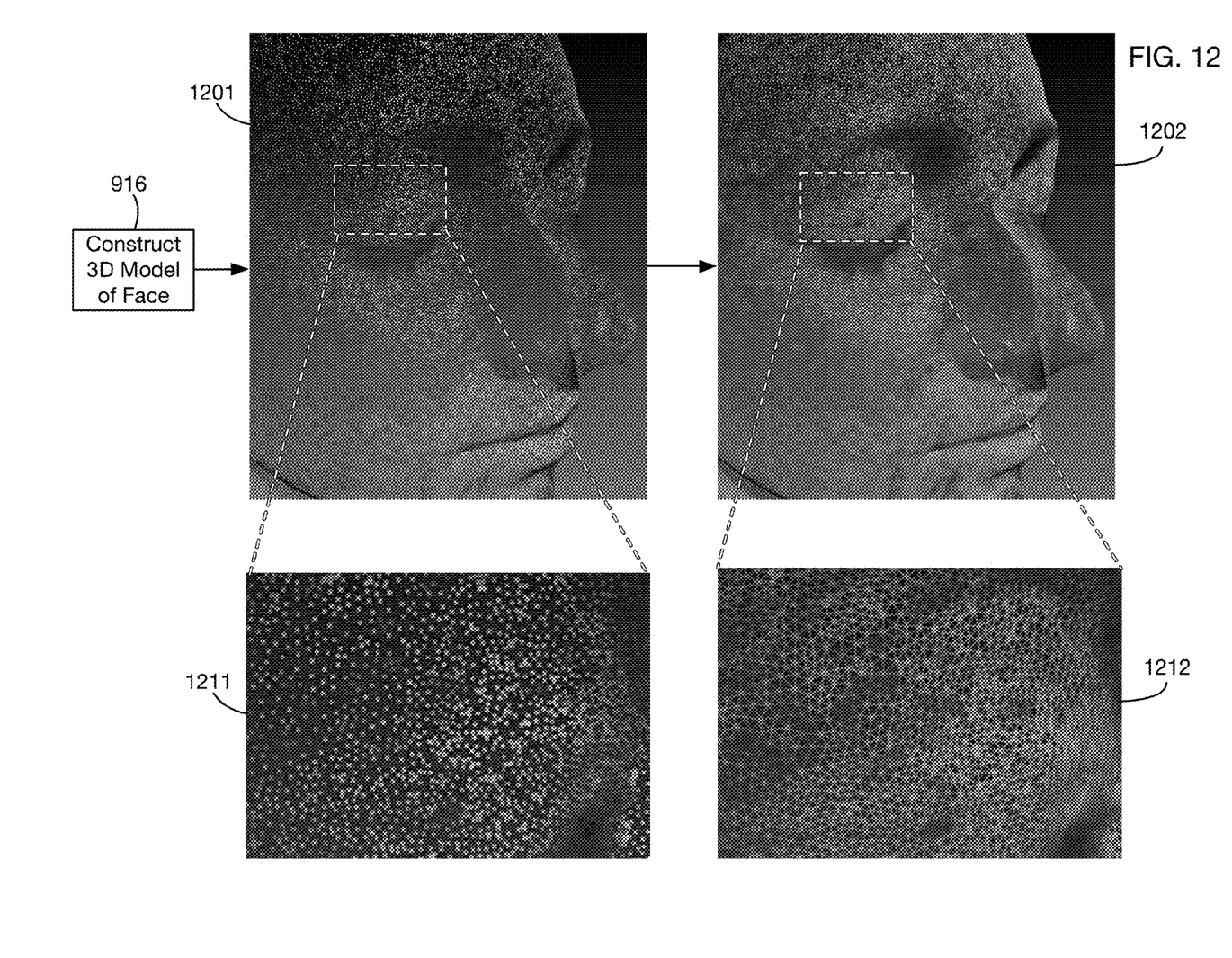
FIG. 12 illustrates steps in constructing a 3D model of a face from different ultraviolet images of the face, using point clouds and tessellation.
Figure 13:
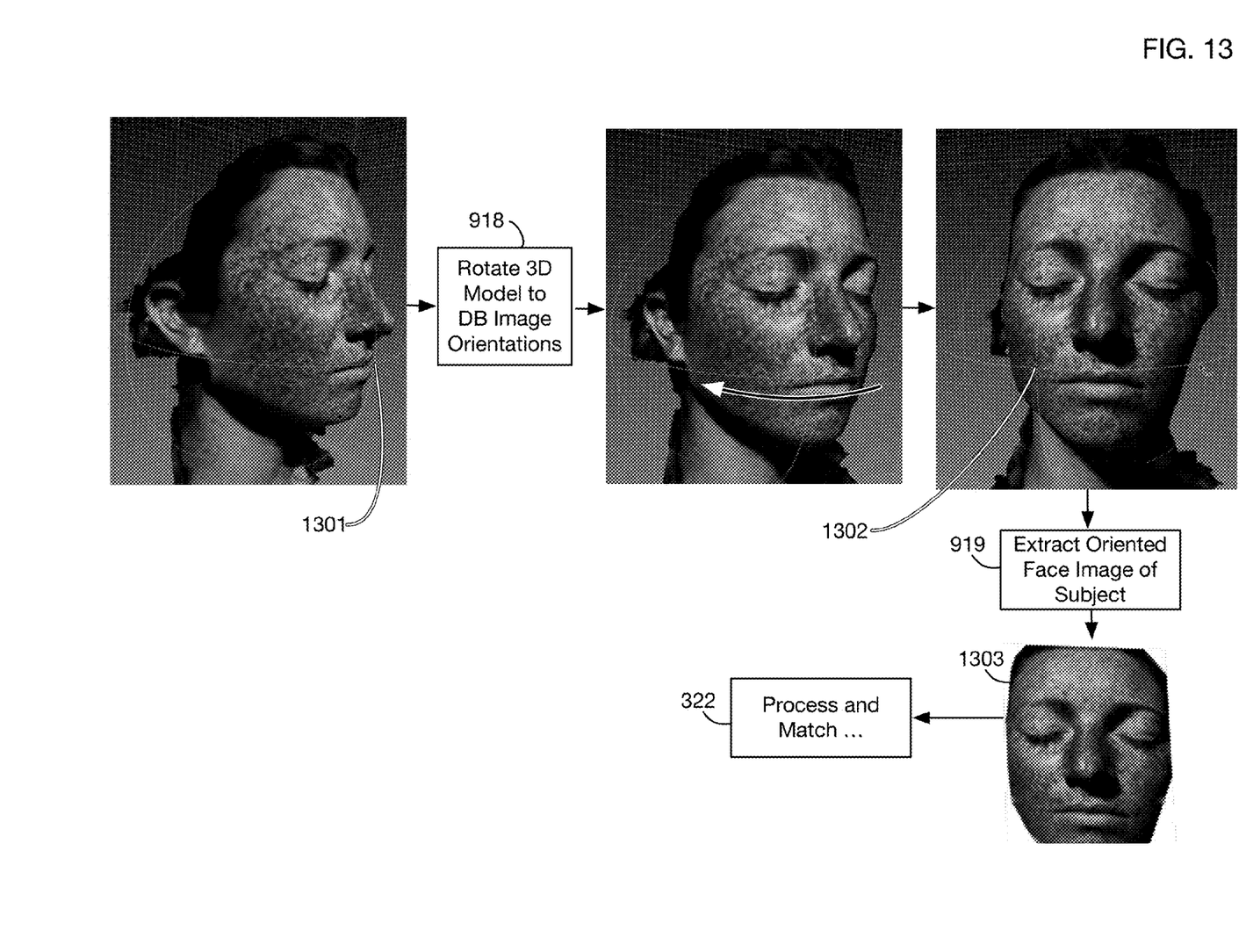
FIG. 13 illustrates rotating a 3D model of a face to an orientation that corresponds to images in the reference database of person images, to simplify image comparison and matching.

FIG. 10 illustrates step 912 of identifying face anchor points within ultraviolet image 1001. In this example, the SIFT algorithm is used to find (and describe) anchor points. The anchor points located are shown as blue dots in FIG. 10, such as anchor point 1002 near the center of the forehead. FIG. 11 illustrates step 914 of locating these anchor points in other images, such as images 1101 and 1102 where the subject is in different orientations and positions. The SIFT algorithm correctly locates the anchor points in these images, finding for example anchor point 1002 by matching SIFT descriptors generated from image 1001. FIG. 12 illustrates step 916 to construct a 3D model of the face from the sequence of face images. A point cloud 1201 is generated for the face (shown in a detailed section in image 1211), and this point cloud is tessellated into a surface 1202 (shown in detailed section 1212). The facial image(s) may then be texture mapped to the surface 1202 to complete the 3D face model. FIG. 13 shows the 3D model 1301 of the face in its initial orientation. Step 918 then rotates this model to orientation 1302, which matches the orientation of image or images in the database to which the face is to be compared. Step 919 then extracts subject face image 1303, which is processed in steps 322 as described previously.

While the invention herein disclosed has been described by means of specific embodiments and applications thereof, numerous modifications and variations could be made thereto by those skilled in the art without departing from the scope of the invention set forth in the claims.

What is claimed is:

1. A facial recognition system that compares narrow band ultraviolet-absorbing skin chromophores, comprising:
   an ultraviolet spectrum image capture element comprising
      a filter that selects wavelengths in an ultraviolet band; and
      an ultraviolet camera that is sensitive to at least said wavelengths in said ultraviolet band;
   a database of person facial images captured in said ultraviolet band, wherein each person facial image of said person facial images is associated with a corresponding person of a plurality of persons; and one or more processors coupled to said ultraviolet camera and to said database, configured to identify person features in said each person facial image;

calculate person feature descriptors of said person features of said each person facial image;

obtain a subject image associated with a subject in said ultraviolet band from said ultraviolet camera;

locate a subject facial image in said subject image;

identify subject features in said subject facial image;

calculate subject feature descriptors of said subject features;

compare said subject feature descriptors to said person feature descriptors of said each person facial image to calculate a correlation score associated with said each person facial image wherein said calculate said correlation score comprises calculate matching feature lines comprising a line segment corresponding to each matching feature pair, wherein said line segment is between a subject feature of said matching feature pair and a corresponding person feature of said matching feature pair, and calculate said correlation score based on said matching feature lines;

select a matching person facial image as a person facial image of said person facial images with a highest associated correlation score, when said highest associated correlation score is greater than a threshold value; and, identify said subject with the corresponding person associated with said matching person facial image.

2. The system of claim 1, wherein said wavelengths in said ultraviolet band comprise 360-370 nanometers.

3. The system of claim 1, wherein said ultraviolet band comprises a bandwidth of less than or equal to 25 nanometers.

4. The system of claim 1, wherein said ultraviolet spectrum image capture element further comprises a lens; and, said lens comprises one or more of quartz, fused silica, sapphire, magnesium fluoride, calcium fluoride or thin low count glass elements or pancake lenses.

5. The system of claim 1, wherein said identify person features comprises locate said person features with a corner detector; and said identify subject features comprises locate said subject features with said corner detector.

6. The system of claim 5, wherein said corner detector is selected from a Moravec family of corner detectors, or a Harris-Stephens, or a Kanade-Lucas-Tomasi, or a Shi-Tomasi or a Förstner corner detector.

7. The system of claim 1, wherein said calculate person feature descriptors comprises calculate SURF descriptors of said person features; and said calculate subject feature descriptors comprises calculate SURF descriptors of said subject features.

8. The system of claim 1, wherein said calculate said correlation score comprises calculate matching feature pairs, each matching feature pair of said matching feature pairs comprising said subject feature of said subject features; and said corresponding person feature of said person features;

wherein a subject feature descriptor of said subject feature descriptors associated with said subject feature matches a person feature descriptor of said person feature descriptors associated with said corresponding person feature.

9. The system of claim 8, wherein said correlation score comprises a count of said matching feature pairs.

10. The system of claim 1, wherein said calculate said correlation score is based on at least a similarity of slopes of said matching feature lines.

11. The system of claim 1, wherein said calculate said correlation score comprises a Fourier transform of the subject and of the corresponding person and a comparison of spectrograms of said subject and said person.

12. The system of claim 1, wherein said one or more processors are further configured to enhance contrast of said person facial images and of said subject facial image.

13. The system of claim 12, wherein said enhance contrast comprises apply a local S-curve transformation to said person facial images and said subject facial image.

14. The system of claim 1, wherein said one or more processors are further configured to transform said each person facial image to a standard size and aspect ratio; and transform said subject facial image to said standard size and aspect ratio.

15. The system of claim 1, wherein said one or more processors are further configured to obtain a sequence of scene images from said ultraviolet camera over a time period;

locate a first image of a face in a first scene image of said sequence of scene images;

locate a corresponding sequence of face images of said face in said sequence of scene images;

construct a three-dimensional model of said face from said sequence of face images; and, rotate said three-dimensional model of said face to an orientation of said each person facial image to form said subject image.

16. The system of claim 15, wherein said locate said corresponding sequence of face images comprises identify anchor points in said first image of said face; and, locate points in said sequence of scene images that match said anchor points.

17. The system of claim 16, wherein said one or more processors are further configured to use a SIFT algorithm to identify said anchor points and to locate points in said sequence of scene images that match said anchor points.

* * * * *